US008638531B2

(12) United States Patent
Bhavaraju et al.

(10) Patent No.: US 8,638,531 B2
(45) Date of Patent: Jan. 28, 2014

(54) HYBRID BI-DIRECTIONAL DC CONTACTOR AND METHOD OF CONTROLLING THEREOF

(75) Inventors: Vijay Bhavaraju, Germantown, WI (US); Tiefu Zhao, Milwaukee, WI (US); Peter J. Theisen, West Bend, WI (US)

(73) Assignee: Eaton Corporation, Cleveland, OH (US)

( * ) Notice: Subject to any disclaimer, the term of this patent is extended or adjusted under 35 U.S.C. 154(b) by 67 days.

(21) Appl. No.: 13/325,174

(22) Filed: Dec. 14, 2011

(65) Prior Publication Data

US 2013/0154774 A1 Jun. 20, 2013

(51) Int. Cl.
*H02H 3/00* (2006.01)

(52) U.S. Cl.
USPC .................................................. 361/2; 361/8

(58) Field of Classification Search
USPC .................................................. 361/2–8, 42
See application file for complete search history.

(56) References Cited

U.S. PATENT DOCUMENTS

| | | | | |
|---|---|---|---|---|
| 4,356,525 | A | 10/1982 | Kornrumpf et al. | |
| 4,360,847 | A | 11/1982 | Bloomer et al. | |
| 4,420,784 | A * | 12/1983 | Chen et al. | 361/7 |
| 4,992,904 | A | 2/1991 | Spencer et al. | |
| 5,057,962 | A | 10/1991 | Alley et al. | |
| 6,650,245 | B2 | 11/2003 | Chung | |
| 7,079,363 | B2 | 7/2006 | Chung | |
| 2003/0183838 | A1 * | 10/2003 | Huang et al. | 257/107 |
| 2008/0143462 | A1 | 6/2008 | Belisle et al. | |
| 2010/0254046 | A1 * | 10/2010 | Liu et al. | 361/8 |

* cited by examiner

*Primary Examiner* — Danny Nguyen
(74) *Attorney, Agent, or Firm* — Ziolkowski Patent Solutions Group, SC

(57) ABSTRACT

A hybrid DC contactor includes contacts that provide a first current path between a DC power source and a load, an electromagnetic coil to position the contacts, a semiconductor switch in parallel with contacts that, when turned on, provides a second parallel current path that diverts current away from the contacts when the main contacts are being opened in either direction. A controller is provided to terminate power to the electromagnetic coil to open the contacts, detect an arc voltage across the contacts as the contacts open, provide a gate signal to the semiconductor switch to pulse the switch on for a pre-determined period of time to route current to the semiconductor switch, measure a current through the contacts and, if current is present through the contacts, then provide another gate signal to the semiconductor switch to pulse the switch on again so as to route current thereto.

23 Claims, 6 Drawing Sheets

HYBRID BI-DIRECTIONAL DC CONTACTOR AND METHOD OF CONTROLLING THEREOF

BACKGROUND OF THE INVENTION

The present invention relates generally to hybrid direct current (DC) contactors and, more particularly, to a system and method for controlling operation of a hybrid DC contactor that improves performance of the hybrid contactor.

Electro-mechanical contactors are used in a variety of environments for turning on and off a power source to a load electrically. The contactors include movable contacts and fixed contacts. The movable contacts are connected to an electromagnet and are controlled to selectively turn on or off power from the source to the load. The contacts are typically maintained in an open position by way of a spring and are caused to translate to a closed position when power to the electromagnet's coil is applied.

When electro-mechanical contactors are used for interrupting AC currents, it is recognized that there is always a time when the current becomes zero. Electro-mechanical contactors can thus interrupt current at the zero current and when the contacts separated. However, when electro-mechanical contactors are used in a DC voltage system, an electric arc may form in the space between contacts during transition of the movable contacts between the closed and open positions. Without intervention, this arc will continue until the separation between the contacts is too large to sustain the arc. When interrupting DC current, the separation between the fixed and moving contacts has to be large (in air, under standard pressure conditions). Thus, it is known to experts in the field that, for interrupting DC currents, special magnets are required in DC contactors.

To address the issue of not being able to interrupt the current caused by arcing, hybrid DC contactors have been developed that incorporate a solid state device that is connected in parallel with the mechanical main contacts. The solid state device may, for example, include an IGBT switch, a snubber capacitor, and a snubber resistor. In operation, when changing the mechanical main contact from the closed state to the open state, the solid state device that is connected in parallel to the mechanical main contact is turned on first. The current flowing through the mechanical main contact is thus caused to flow through the solid state device. Next, the mechanical main contact is allowed to open by removing the voltage applied to the electromagnet coil that controls positioning of the mechanical main contact. By turning on the solid state device prior to opening the mechanical main contact, the voltage on both ends of the turned-on solid state device and the mechanical main contact can be opened with only a minimal voltage not sufficient to form an arc.

While existing hybrid DC contactors do function to provide a bypass path to the mechanical contacts, there are drawbacks to the design and control of such hybrid DC contactors. One such drawback to existing hybrid DC contactors is that, when bypassing the main contacts, the separation between the moving and fixed contacts cannot be determined. Not knowing the separation, the sold state device is left closed for a fixed but long enough delay to ensure interruption of the current. As such, the full current value needs to flow through the solid state switch for several milliseconds, necessitating that the solid state switch be oversized to handle several milliseconds of current. This oversizing of the IGBT switch increases the production cost of existing hybrid DC contactors.

Another drawback to existing drawback hybrid DC contactors is that the switching time of the contactor is prolonged enough that the contacts may still be exposed to an undesirable "restrike" of arcing. That is, when interrupting DC currents due to the inductance in the circuit, the voltage across the main contacts rapidly rises, and this rapid rise in voltage can cause a breakdown of the air gap between the fixed and moving contacts called "restrike." The fixed and moving contacts have to be separated by a sufficient gap to prevent such a restrike (that is based on contactor design and other conditions). Still another drawback of the prior art hybrid DC contactors is that, if there is restrike of the arc, there is no capability to know the condition and this could result in the burning out of the contactor. Still another drawback to existing drawback hybrid DC contactors is that they do not provide galvanic isolation, which is desirable in some implementations of hybrid DC contactors. Still another drawback is that the existing design of hybrid DC contactors is not suitable for bidirectional currents.

It would therefore be desirable to provide a hybrid DC contactor system circuit and method for controlling thereof that reduces the time the solid state device carries the current, provides the capability to determine if the gap between the fixed and moving contacts is enough not to cause a restrike, provides for detection of a strike and ensures to turn on the solid state switch once again to ensure that the current is interrupted, provides galvanic isolation, and is suitable for bidirectional currents. Such a circuit could advantageously be applied to a breaker that can trip due to an over current or by a shunt trip. When the arc is detected, the circuit automatically waits, pulses the IGBT, and interrupts the current. The circuit could also be configured as a bidirectional circuit that is applied to circuit breakers as well. This hybrid contactor coil can be opened to activate the circuit with a number of detection circuits such as the following commonly used: over-current detectors, over-voltage or under-voltage detectors, and ground fault detectors.

BRIEF DESCRIPTION OF THE INVENTION

The present invention provides a system and method for controlling operation of a hybrid DC contactor.

In accordance with one aspect of the present invention, a hybrid direct current (DC) contactor includes a plurality of main contacts configured to provide a first current path between a DC power source and a load, an electromagnetic coil configured to position the plurality of main contacts in a closed position when power is supplied thereto, with the plurality of main contacts moving from the closed position to an open position when power to the electromagnetic coil is terminated. The hybrid DC contactor also includes a solid state device positioned in parallel with of the plurality of main contacts, the solid state device including a semiconductor switch that, when turned on, provides a second, parallel current path that diverts current away from the plurality of main contacts when the main contacts are being opened in either direction. The hybrid DC contactor further includes a controller configured to terminate a supply of power to the electromagnetic coil so as to cause the plurality of main contacts to begin to open, detect an arc voltage across the main contacts as the main contacts are opening, provide a gate signal to the semiconductor switch to cause the semiconductor switch to pulse on for a pre-determined period of time so as to route current to the semiconductor switch, measure a current through the main contacts and, if current is still present through the main contacts, then provide another gate signal to the semiconductor switch to cause the semiconductor switch to again pulse on for another pre-determined period of time so as to route current to the semiconductor switch.

In accordance with another aspect of the invention, a method for controlling current flow in a hybrid DC contactor includes providing a hybrid DC contactor on a circuit between a DC power source and a DC load, the hybrid DC contactor comprising a multi-pole arrangement and a solid state switch positioned in parallel with the multi-pole arrangement such that current is diverted away from the multi-pole arrangement and to the solid state device when the solid state device is turned on. The method also includes causing poles of the multi-pole arrangement to translate from a closed position to an open position and, during translation of the poles of the multi-pole arrangement from the closed position to the open position, the method further includes detecting a contact arcing across the poles of the multi-pole arrangement when all poles of the multi-pole arrangement are open and intermittently providing a pulsed gate signal to the solid state switch so as to selectively divert current to the solid state switch, wherein each gate signal causes the solid state switch to turn on for a pre-determined duration to divert current thereto and wherein the pulsed gate signal is intermittently provided to the solid state switch until it is determined that current through the poles of the multi-pole arrangement has been interrupted.

In accordance with yet another aspect of the invention, a hybrid direct current (DC) switching device includes an electromechanical switch comprising contacts movable between an open position and a closed position so as selectively provide a first current path between a DC power source and a load when the contacts are in the closed position and a solid state device positioned in parallel with the contacts of the electromechanical switch, the solid state device including a semiconductor switch that, when turned on, provides a second, parallel current path that diverts current away from the main contacts when the contacts are being opened. The hybrid DC switching device also includes a controller configured to detect an arc voltage through the contacts as the contacts begin to open from the closed position, institute a delay period configured to prevent a re-strike voltage across the contacts upon detecting the arc voltage, provide a gate signal to the semiconductor switch to cause the semiconductor switch to pulse on for a pre-determined period of time so as to route current to the semiconductor switch, measure a current through the contacts, and if current is still present through the contacts, then provide another gate signal to the semiconductor switch to cause the semiconductor switch to again pulse on for another pre-determined period of time so as to route current to the semiconductor switch.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENTS

The embodiments of the invention set forth herein relate to a system and method for controlling operation of a hybrid DC contactor. A hybrid DC contactor is provided that includes a semiconductor switch connected in parallel to the plurality of contacts, so as to provide a parallel current path that diverts current away from the plurality of main contacts when the semiconductor switch is turned on and the power to the coil is de-energized (the current will not go through the IGBT when the contacts are closed). When the main contacts are desired to be opened, and start to open, a controller associated with the hybrid DC contactor detects an arc voltage across the main contacts. After the arc voltage is detected, the controller institutes a delay period before then providing a gate signal to the semiconductor switch to cause the semiconductor switch to pulse on for a pre-determined period of time so as to route all the current to the semiconductor switch. Upon pulsing the semiconductor switch on for the pre-determined period of time, a current through the main contacts is measured and, if current is still present, the controller continues to provide additional intermittent gate signals to the semiconductor switch as needed to cause the semiconductor switch to again pulse on for additional periods of time so as to route current to the semiconductor switch, until the current through the main contacts is interrupted.

Figure 1:
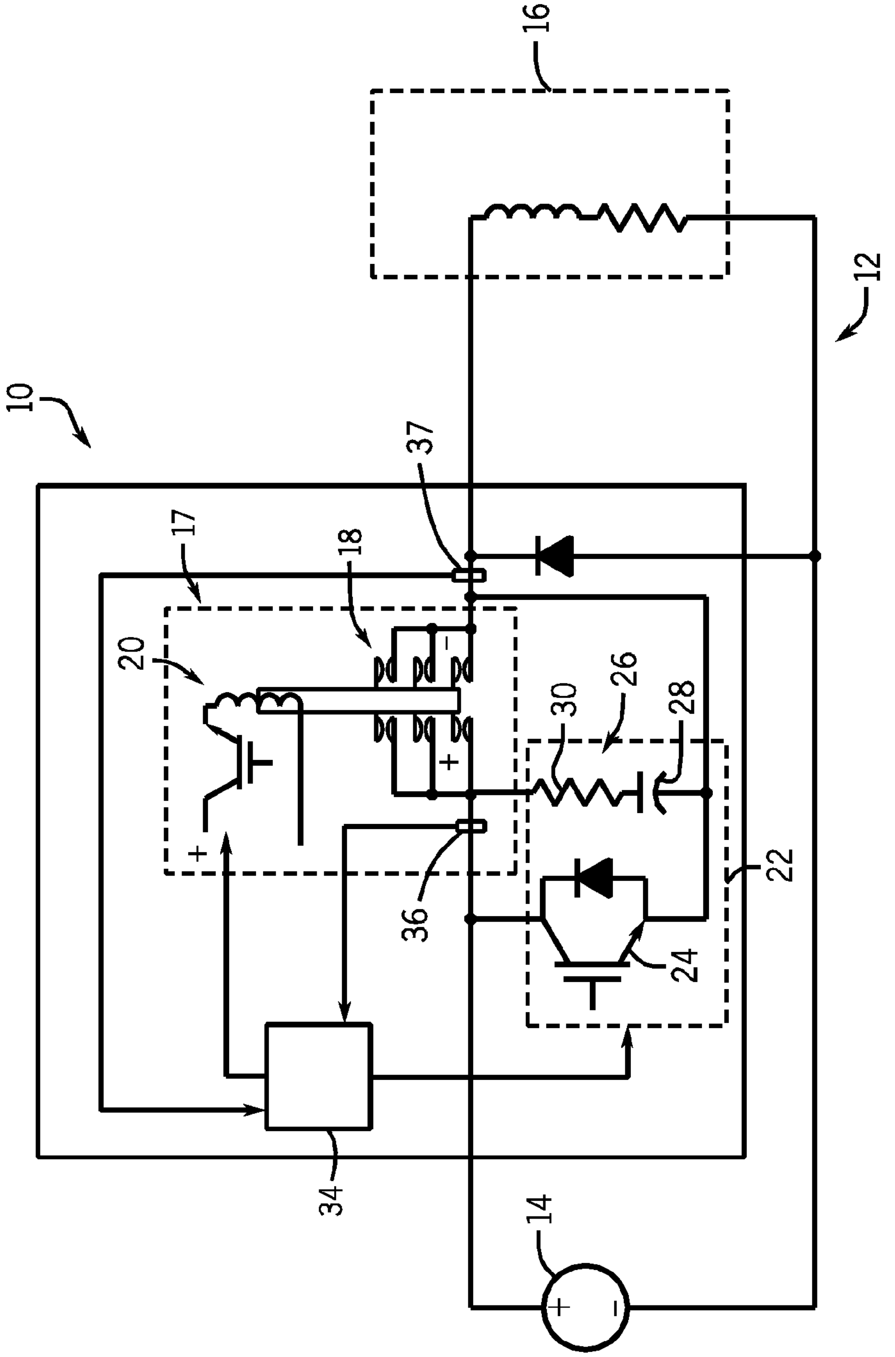
FIG. 1 is a schematic view of a power circuit incorporating a hybrid DC contactor according to an embodiment of the present invention.

Referring now to FIG. 1, a circuit diagram illustrating a construction of a hybrid DC contactor 10 is shown according to an embodiment of the invention. As depicted in FIG. 1, hybrid DC contactor 10 is incorporated into a circuit 12 that includes a DC power source 14 and a load 16. While load 16 is shown in FIG. 1 as an inductive DC load, it is recognized that the load could also be a motor, motor drive, inverter, or renewable energy type load, according to embodiments of the invention. According to one embodiment of the invention, and as shown in FIG. 1, the DC power source 14 is selectively connected to and separated from DC load 16 through a standard AC electro-mechanical contactor 17 (i.e., multi-pole arrangement) that includes a plurality of mechanical main contacts/poles 18, with the contacts being in the form of movable contacts and fixed contacts. The main contacts 18 of the standard electro-mechanical contactor 17 provide a first current path between the power source 14 and load 16 when the movable contacts thereof are in a closed position. According to one embodiment of the invention, and as shown in FIG. 1, the standard electro-mechanical contactor 17 may be constructed as a three-pole AC contactor, where three main contacts 18 are positioned in a parallel arrangement. It is recognized, however, that other constructions of electromechanical contactors 17 are considered within the scope of the invention, such that the electro-mechanical contactor 17 may include a different number of contacts/poles 18 in different arrangements. Additionally, it is recognized that the electro-mechanical contactor 17 could be replaced by a relay or a breaker, according to additional embodiments of the invention.

Figure 3:
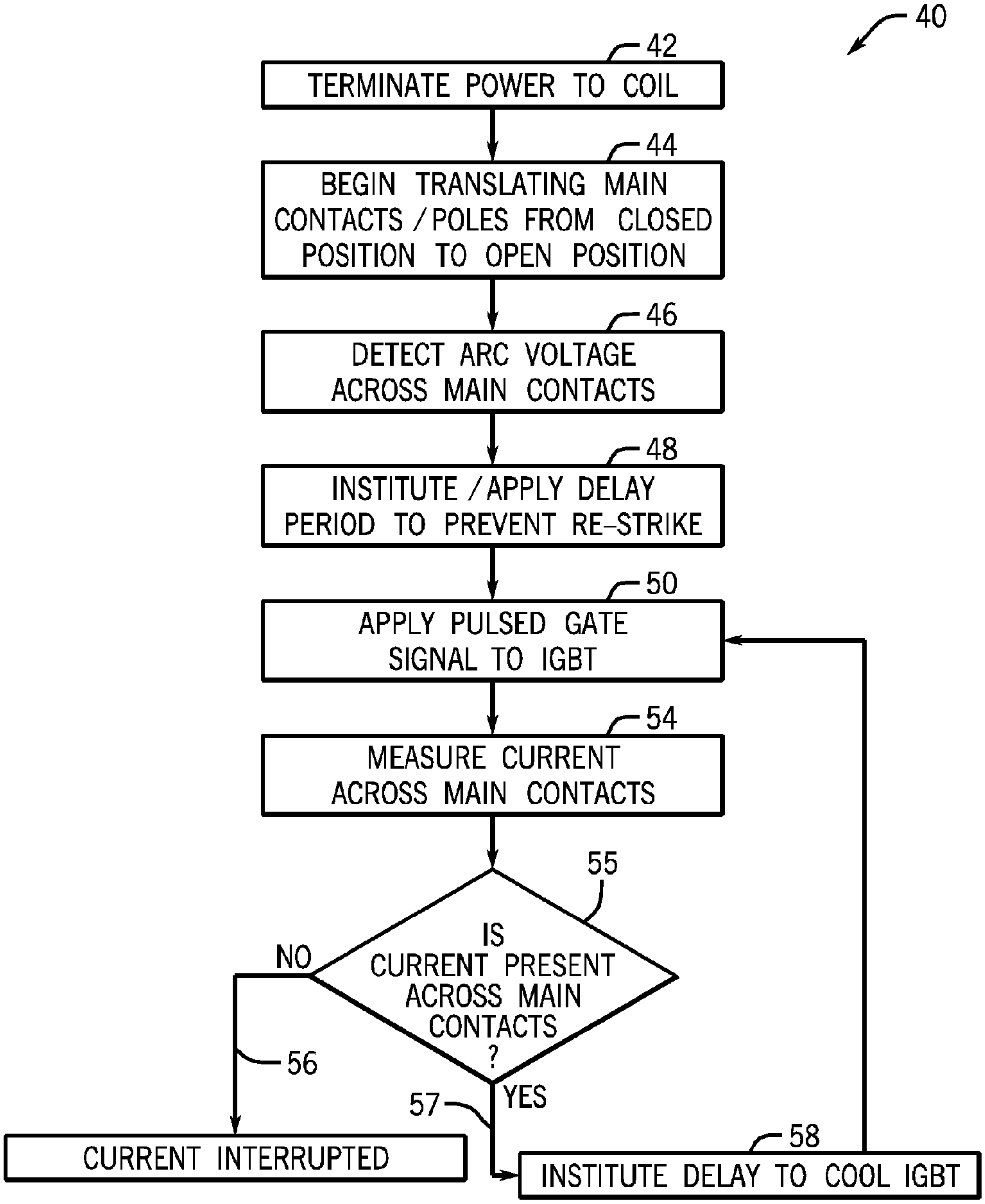
FIGS. 3 and 4 are a flowchart and timeline respectively illustrating a control scheme for operating the hybrid DC contactor of FIG. 1 according to an embodiment of the invention.

As shown in the hybrid DC contactor 10 of FIG. 1, for controlling actuation of the movable contacts, the electro-mechanical contactor 17 includes an electromagnetic coil 20 that is positioned in proximity to the contacts 18, with the electromagnetic coil 20 acting to impart a force on the movable contacts 18 when closing and with a spring (not shown) being used to open the contacts. When power is provided to the electromagnetic coil 20, this force is applied to the contacts 18 to cause the movable contacts to close. When power is terminated to the electromagnetic coil 20, the force is removed, and a spring (not shown) that normally biases the movable contacts in the open position, acts to cause the movable contacts to translate from the closed position to the open position. This opening action takes several milliseconds (e.g., 11 ms, as shown in FIG. 3).

The hybrid DC contactor 10 further includes a solid state device 22 that is connected/positioned in parallel with the electro-mechanical contactor 17, such that the solid state device 22 provides a second, parallel current path that diverts current away from the electro-mechanical contactor 17 when the switching unit is turned on. Specifically, the solid state device 22 includes a semiconductor switch 24, such as an insulated-gate bipolar transistor (IGBT) switch or other suitable switch, that can be selectively turned on and off to divert current away from the main contacts 18 of electro-mechanical contactor 17. The solid state device 22 also includes a snubber circuit 26 in parallel with the IGBT 24, with the snubber circuit 26 having a capacitor 28 and a resistor 30 in series that function to suppress voltage transients in the solid state device 22, so as to protect the IGBT 24. According to one embodiment of the invention, a free-wheeling diode 32 is also included in hybrid DC contactor 10 to circulate inductive load currents, such that the source circuit is quickly isolated.

In operation, when it is desired to actuate the movable contacts 18 from a closed position to an open position, a supply power provided to electromagnetic coil 20 is terminated and the IGBT 24 is turned on, such that the current flowing through the main contacts 18 is caused to flow through the IGBT 24 and the main contacts 18 can be opened with minimal arcing occurring across the main contacts. For controlling operation of the electromagnetic coil 20 and the solid state device 22, one or more controllers 34 (shown as a single controller in FIG. 1) is provided that functions to control a supplying of power to electromagnetic coil 20 and the generating of gate signals for controlling the on/off condition of IGBT 24. During opening of the movable main contacts 18, voltage and current sensors 36, 37 included in hybrid DC contactor 10 functions to measure a level of voltage and current, respectively, across the contacts 18, as will be explained in greater detail below.

Figure 2:
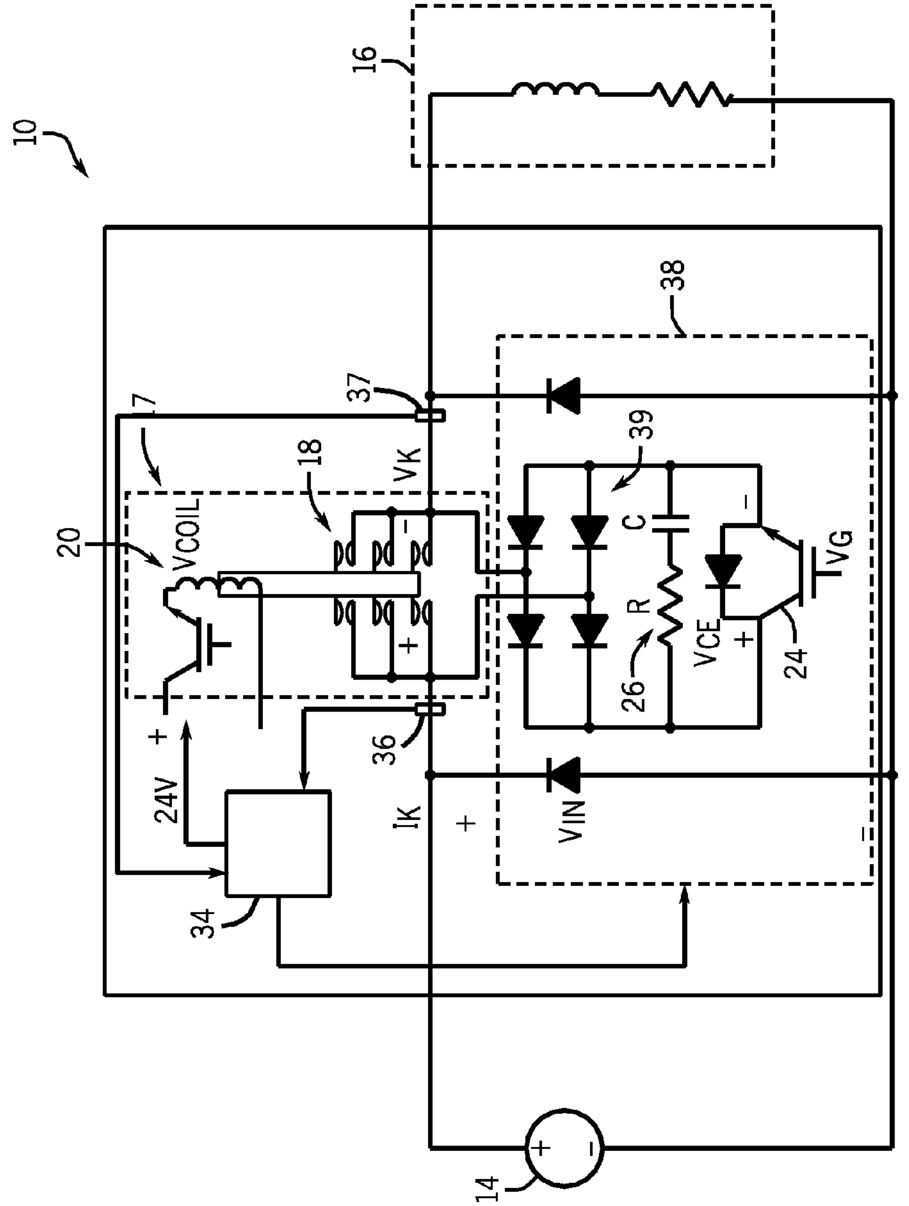
FIG. 2 is a schematic view of a power circuit incorporating a hybrid DC contactor according to another embodiment of the present invention.

While the hybrid DC contactor 10 in FIG. 1 is constructed as a unidirectional contactor with no galvanic isolation, it is recognized that the hybrid DC contactor 10 could have other alternative constructions, according to different embodiments of the invention. For example, a hybrid DC contactor 10 is illustrated in FIG. 2 that is configured as a bidirectional contactor. As illustrated in FIG. 2, hybrid DC contactor 10 includes a solid state device 38 that enables operation of hybrid DC contactor 10 as a bidirectional contactor. The solid state device 38 includes a semiconductor switch 24, such as an insulated-gate bipolar transistor (IGBT) switch or other suitable switch and a snubber circuit 26 in parallel with the IGBT 24, along with a plurality of diodes 39 that function to selectively control current flow in a bidirectional manner. Free-wheeling diodes 32 on either side allow the flow of inductive load currents.

Figure 4:
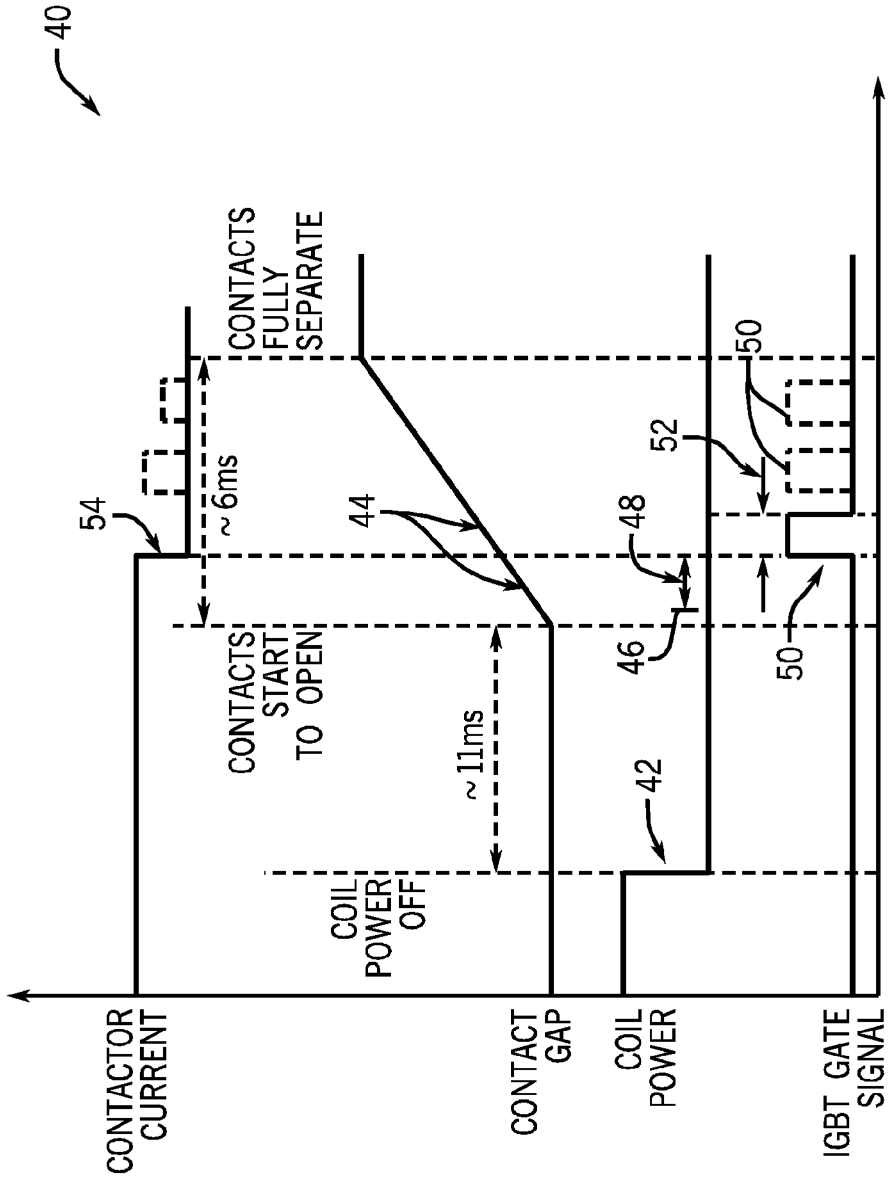

Referring now to FIGS. 3 and 4, and with continued reference to FIGS. 1 and 2, a flowchart and timeline, respectively, of a technique/control scheme 40 implemented by controller 34 for controlling operation of hybrid DC contactor 10 are illustrated, according to an embodiment of the invention. According to the controller implemented technique 40, when it is desired to actuate the movable main contacts 18 from a closed position to an open position, the controller 34 first acts to terminate a supply power to electromagnetic coil 20, illustrated at 42. The termination of power to electromagnetic coil 20 causes the movable main contacts 18 to begin to open after a minimal time (e.g., ~11 milliseconds), as indicated at 44. Upon actuation of the movable main contacts 18 being initiated, the controller 34 then acts to detect an arc voltage/contact arcing across the main contacts 18, indicated at 46. Once it is determined that contact arcing is present across the main contacts 18, the controller 34 then institutes a delay period, indicated at 48, before transmitting a gate signal to the IGBT 24 to turn the IGBT on, as indicated at 50. The delay period instituted by the controller 34 allows for the main contacts 18 to further separate and is of sufficient length that a re-strike voltage across the main contacts 18 is prevented.

After the delay period has passed, the technique 40 continues with the controller 34 transmitting a gate signal to the IGBT 24 to turn the IGBT on, as indicated at 50. As shown in FIGS. 3 & 4, according to an exemplary embodiment of the invention, the gate signal is a pulsed gate signal of a short duration that causes the IGBT 24 to be turned on for a pre-determined period of time, indicated at 52 (FIG. 4), after which the gate signal is terminated and the IGBT 24 is turned off. While the length of time for which the gate signal is pulsed to IGBT 24 may vary based on system requirements, according to one embodiment the IGBT 24 is pulsed on for 50 microseconds.

After the pulsed gate signal to the IGBT 24 is terminated, the controller 34 then measures a current through the main contacts 18, as indicated at 54, and determines whether current is still present or has been interrupted, as indicated at 55 (FIG. 3). If no current is detected through the main contacts 18, indicated at 56 (FIG. 3), then it is confirmed that the current has been interrupted, and thus the controller 34 does not generate/transmit any additional gate signals to the IGBT 24 to turn the IGBT on. However, if current is detected through the main contacts 18 after the pulsed gate signal to the IGBT 24, indicated at 57 (FIG. 3), then the controller 34 functions to initiate/institute a small to allow the IGBT 24 to cool, as indicated at 58, before providing another pulsed gate signal to the IGBT 24 to cause the IGBT 24 to again pulse on for another pre-determined period of time to again route current to the IGBT 24, as indicated at 50 (in phantom in FIG. 4). The controller 34 then repeats the process of measuring/monitoring a current through the main contacts 18 to determine whether current is still present or has been interrupted, and continues to intermittently provide additional pulsed gate signals to the IGBT 24 as long as current is detected through the main contacts 18. Again, while the length of time for which the gate signals are pulsed to IGBT 24 to turn on the IGBT may vary based on system requirements, according to one embodiment, each additional gate signal after the initial gate signal pulses the IGBT 24 on for 20 microseconds.

The intermittent pulsing of the gate signal to the IGBT 24 while the main contacts 18 are transitioning from the closed position to the open position provides/ensures that the IGBT 24 carries current for only very short durations, thus reducing losses and reducing the size of the IGBT 24 that is required. That is, by implementing the technique/control scheme 40, the size of the IGBT 24 can be reduced by approximately 30% on average. The wear experienced by main contacts 18 is also minimized by way of the pulsing of the IGBT 24, as the contacts arc for only a short time. Additionally, the technique/control scheme 40 for controlling hybrid DC contactor 10 reduces the time needed to open the main contacts 18 and circuit 12, with time reductions of 1-3 milliseconds being achievable. That is, by implementing the technique/control scheme 40, the delay for commuting the current with the IGBT 24 will be approximately 200 microseconds, with the current interrupting then occurring within an additional 50 microseconds.

Figure 5:
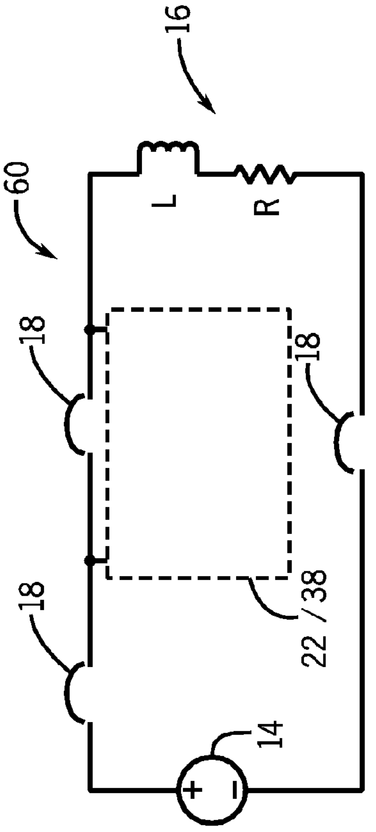
FIG. 5 is a schematic view of a power circuit incorporating a hybrid DC contactor according to another embodiment of the present invention.
Figure 6:
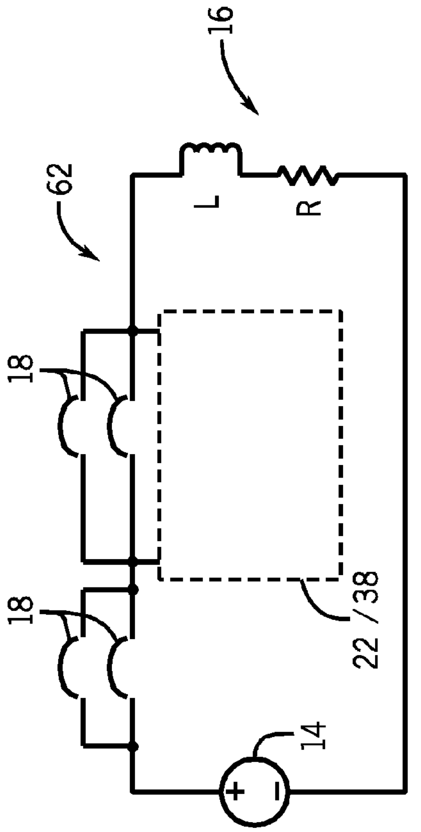
FIG. 6 is a schematic view of a power circuit incorporating a hybrid DC contactor according to another embodiment of the present invention.
Figure 8:
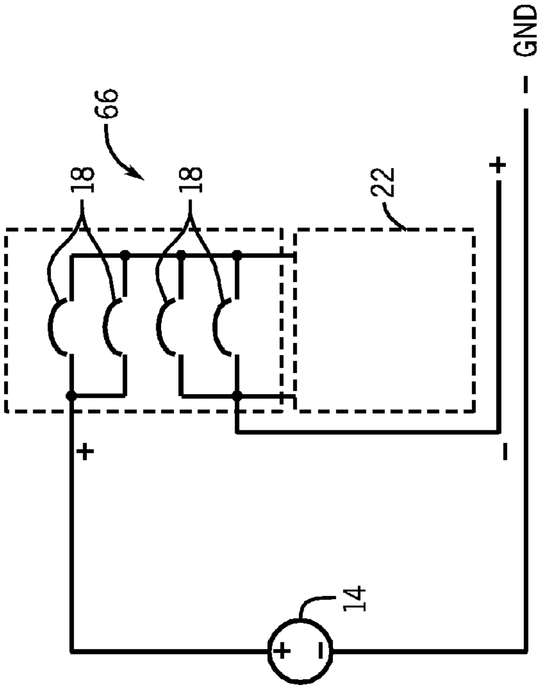
FIG. 8 is a schematic view of a power circuit incorporating a hybrid DC contactor according to another embodiment of the present invention.
Figure 7:
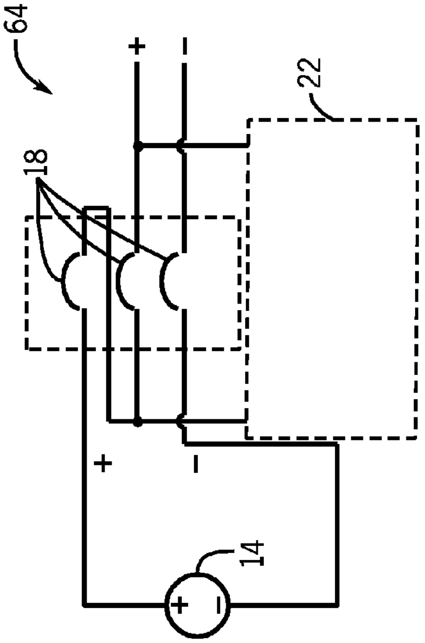
FIG. 7 is a schematic view of a power circuit incorporating a hybrid DC contactor according to another embodiment of the present invention.

Referring now to FIGS. 5-8, alternative constructions of a hybrid DC contactor are illustrated with which the control scheme 40 of FIGS. 3 & 4 can be implemented, according to embodiments of the invention. As shown in FIG. 5, a hybrid DC contactor 60 is constructed as a three-pole contactor, with the solid state device 22/38 connected in parallel with one of the poles 18. As shown in FIG. 6, a hybrid DC contactor 62 is constructed as a four-pole contactor, with the solid state device 22/38 connected in parallel with two of the poles 18. In each of FIGS. 5 and 6, the hybrid DC contactor 60, 62 is constructed so as to provide galvanic isolation on both positive and negative poles. According to one embodiment, the galvanic isolation may be achieved using only a single contactor bar, such as a multi-pole AC contactor bar that has desired electrical creepage and clearance distances. As shown in FIGS. 7 and 8, hybrid DC contactors 64, 66 may also be constructed that do not provide galvanic isolation. The hybrid DC contactor 64 of FIG. 7 is constructed as a three-pole contactor, with the solid state device 22/38 connected in parallel with one of the poles 18. The hybrid DC contactor 66 of FIG. 8 is constructed as a four-pole contactor, with the solid state device 22/38 connected in parallel with two of the poles 18. It is recognized that embodiments of the present are not meant to be limited by the hybrid DC contactors 60, 62, 64, 66 shown in FIGS. 5-8, and that other hybrid DC contactor structures could be provided with which the control scheme 40 of FIGS. 3 & 4 can be implemented, according to embodiments of the invention. It is further recognized that each of the hybrid DC contactors 60, 62, 64, 66 shown in FIGS. 5-8 could be constructed as unidirectional or bidirectional contactors, based on implementing of a solid state device 22 as illustrated in FIG. 1 or a implementing a solid state device 38 as illustrated in FIG. 2, respectively.

While embodiments of the invention set forth above are shown and described with respect to a hybrid DC contactor 10 that includes an electro-mechanical contactor 17 therein, it is recognized that a relay, breaker, or other electro-mechanical switch could be substituted for the electro-mechanical contactor. In one such embodiment, a shunt trip would be provided for switching the breaker between an open and closed state for selectively conducting current therethrough. A control scheme as illustrated in FIGS. 3 and 4 could then be implemented for controlling operation of such a hybrid device that includes the breaker and a parallelly connected solid state device.

Embodiments of the invention thus provide a hybrid DC contactor, and method of controlling thereof, that reduces the amount of time that the IGBT carries current (so as to allow for a reduction in size thereof), reduces switching time, and provides galvanic isolation. The hybrid DC contactor provides the capability to determine if the gap between the fixed and moving contacts is enough not to cause a restrike, provides for detection of a strike, and ensures to turn on the solid state switch once again to ensure that the current is interrupted. The hybrid DC contactor also provides galvanic isolation and is suitable for bidirectional currents. Such a circuit would advantageously provide for the circuit to be applied to a breaker that can trip due to an over current or by a shunt trip. When the arc is detected, the circuit automatically waits, pulses the IGBT, and interrupts the current. The circuit could also be configured as a bidirectional circuit that is applied to circuit breakers as well. This hybrid contactor coil can be opened to activate the circuit with a number of detection circuits such as the following commonly used circuits: overcurrent detectors, over-voltage or under-voltage detectors, and ground fault detectors.

A technical contribution for the disclosed method and apparatus is that it provides for a controller-implemented technique for controlling operation of a hybrid DC contactor. The technique detects an arc voltage across main contacts of the contactor and provides a pulsed gate signal to the semiconductor switch in parallel with the main contacts to cause the switch to pulse on for a pre-determined period of time and route current to the semiconductor switch. Upon pulsing the semiconductor switch on for the pre-determined period of time, a current through the main contacts is measured and, if current is still present, the controller continues to provide additional intermittent gate signals to the semiconductor switch as needed to cause the semiconductor switch to again pulse on for additional periods of time so as to route current to the semiconductor switch, until the current through the main contacts is interrupted.

Therefore, according to one embodiment of the present invention, a hybrid direct current (DC) contactor includes a plurality of main contacts configured to provide a first current path between a DC power source and a load, an electromagnetic coil configured to position the plurality of main contacts in a closed position when power is supplied thereto, with the plurality of main contacts moving from the closed position to an open position when power to the electromagnetic coil is terminated. The hybrid DC contactor also includes a solid state device positioned in parallel with the plurality of main contacts, the solid state device including a semiconductor switch that, when turned on, provides a second, parallel current path that diverts current away from the plurality of main contacts when the main contacts are being opened in either direction. The hybrid DC contactor further includes a controller configured to terminate a supply of power to the electromagnetic coil so as to cause the plurality of main contacts to begin to open, detect an arc voltage across the main contacts as the main contacts are opening, provide a gate signal to the semiconductor switch to cause the semiconductor switch to pulse on for a pre-determined period of time so as to route current to the semiconductor switch, measure a current through the main contacts and, if current is still present through the main contacts, then provide another gate signal to the semiconductor switch to cause the semiconductor switch to again pulse on for another pre-determined period of time so as to route current to the semiconductor switch.

According to another embodiment of the present invention, a method for controlling current flow in a hybrid DC contactor includes providing a hybrid DC contactor on a circuit between a DC power source and a DC load, the hybrid DC contactor comprising a multi-pole arrangement and a solid state switch positioned in parallel with the multi-pole arrangement such that current is diverted away from the multi-pole arrangement and to the solid state device when the solid state device is turned on. The method also includes causing poles of the multi-pole arrangement to translate from a closed position to an open position and, during translation of the poles of the multi-pole arrangement from the closed position to the open position, the method further includes detecting a contact arcing across the poles of the multi-pole arrangement when all poles of the multi-pole arrangement are open and intermittently providing a pulsed gate signal to the solid state switch so as to selectively divert current to the solid state switch, wherein each gate signal causes the solid state switch to turn on for a pre-determined duration to divert current thereto and wherein the pulsed gate signal is intermittently provided to the solid state switch until it is determined that current through the poles of the multi-pole arrangement has been interrupted.

According to yet another embodiment of the present invention, a hybrid direct current (DC) switching device includes an electromechanical switch comprising contacts movable between an open position and a closed position so as selectively provide a first current path between a DC power source and a load when the contacts are in the closed position and a solid state device positioned in parallel with the contacts of the electromechanical switch, the solid state device including a semiconductor switch that, when turned on, provides a second, parallel current path that diverts current away from the main contacts when the contacts are being opened. The hybrid DC switching device also includes a controller configured to detect an arc voltage through the contacts as the contacts begin to open from the closed position, institute a delay period configured to prevent a re-strike voltage across the contacts upon detecting the arc voltage, provide a gate signal to the semiconductor switch to cause the semiconductor switch to pulse on for a pre-determined period of time so as to route current to the semiconductor switch, measure a current through the contacts, and if current is still present through the contacts, then provide another gate signal to the semiconductor switch to cause the semiconductor switch to again pulse on for another pre-determined period of time so as to route current to the semiconductor switch.

The present invention has been described in terms of the preferred embodiment, and it is recognized that equivalents, alternatives, and modifications, aside from those expressly stated, are possible and within the scope of the appending claims.

What is claimed is:

1. A hybrid direct current (DC) contactor comprising:

a multi-pole arrangement comprising a plurality of poles configured to provide a first current path between a DC power source and a load;

an electromagnetic coil configured to position the plurality of poles in a closed position when power is supplied thereto, with the plurality of poles moving from the closed position to an open position when power to the electromagnetic coil is terminated;

a solid state device positioned in parallel with the plurality of poles, the solid state device including a semiconductor switch that, when turned on, provides a second, parallel current path that diverts current away from the plurality of poles when the poles are being opened in either direction; and a controller configured to:

terminate a supply of power to the electromagnetic coil so as to cause the plurality of poles to begin to open;

detect an arc voltage across the poles as the main poles are opening;

provide a gate signal to the semiconductor switch to cause the semiconductor switch to pulse on for a pre-determined period of time so as to route current to the semiconductor switch;

measure a current through the main contacts; and if current is still present through the poles, then provide another gate signal to the semiconductor switch to cause the semiconductor switch to again pulse on for another pre-determined period of time so as to route current to the semiconductor switch.

2. The hybrid DC contactor of claim 1 wherein the controller is further configured to institute a delay period subsequent to detecting the arc voltage and prior to providing the gate signal to the semiconductor switch, so as to prevent a re-strike voltage across the poles.

3. The hybrid DC contactor of claim 1 wherein the solid state device comprises one of a unidirectional switch and a bidirectional switch.

4. The hybrid DC contactor of claim 1 wherein the pre-determined period of time for which the semiconductor switch is pulsed on is 50 microseconds for a first gate signal and 20 microseconds for each additional gate signal.

5. The hybrid DC contactor of claim 1 wherein the solid state device is positioned in parallel with a pair of poles.

6. The hybrid DC contactor of claim 1 wherein the semiconductor switch comprises an insulated-gate bipolar transistor (IGBT).

7. The hybrid DC contactor of claim 1 wherein the solid state device further comprises a snubber circuit including a capacitor and a resistor, the snubber circuit configured to suppress voltage transients in the solid state device.

8. The hybrid DC contactor of claim 1 further comprising a free-wheeling diode configured to circulate load inductive currents.

9. The hybrid DC contactor of claim 1 wherein the plurality of poles comprises an AC contactor bar with the plurality of poles in a parallel arrangement, the AC contactor bar being configured to provide galvanic isolation between the plurality of poles.

10. A method for controlling current flow in a hybrid DC contactor, the method comprising:

providing a hybrid DC contactor on a circuit between a DC power source and a DC load, the hybrid DC contactor comprising a multi-pole arrangement and a solid state switch positioned in parallel with the multi-pole arrangement such that current is diverted away from the multi-pole arrangement and to the solid state device when the solid state device is turned on; and causing poles of the multi-pole arrangement to translate from a closed position to an open position; and during translation of the poles of the multi-pole arrangement from the closed position to the open position:

detecting a contact arcing across the poles of the multi-pole arrangement when all poles of the multi-pole arrangement are open; and intermittently providing a pulsed gate signal to the solid state switch so as to selectively divert current to the solid state switch, wherein each gate signal causes the solid state switch to turn on for a pre-determined duration to divert current thereto;

wherein the pulsed gate signal is intermittently provided to the solid state switch until it is determined that current through the poles of the multi-pole arrangement has been interrupted.

11. The method of claim 10 further comprising instituting a delay period subsequent to detecting the contact arcing and prior to providing the pulsed gate signal to the solid state switch, so as to prevent a re-strike voltage across the poles of the multi-pole arrangement.

12. The method of claim 10 wherein providing the pulsed gate signal to the solid state switch comprises:

providing a first pulsed gate signal to the solid state switch to cause the solid state switch to turn on for a first pre-determined duration;

monitoring current in the poles of the multi-pole arrangement by way of a current sensor; and providing additional pulsed gate signals to the solid state switch, each of the additional pulsed gate signals causing the solid state switch to turn on for a second pre-determined duration different from the first pre-determined duration.

13. The method of claim 12 wherein the first pre-determined duration is approximately 50 microseconds and the second pre-determined duration is approximately 20 microseconds.

14. The method of claim 10 wherein the hybrid DC contactor provides galvanic isolation between the poles of the multi-pole arrangement.

15. A hybrid direct current (DC) switching device comprising:

an electromechanical switch comprising contacts movable between an open position and a closed position so as selectively provide a first current path between a DC power source and a load when the contacts are in the closed position;

a solid state device positioned in parallel with the contacts of the electromechanical switch, the solid state device including a semiconductor switch that, when turned on, provides a second, parallel current path that diverts current away from the main contacts when the contacts are being opened; and a controller configured to:

detect an arc voltage through the contacts as the contacts begin to open from the closed position;

upon detecting the arc voltage, institute a delay period configured to prevent a re-strike voltage across the contacts;

provide a gate signal to the semiconductor switch to cause the semiconductor switch to pulse on for a pre-determined period of time so as to route current to the semiconductor switch;

measure a current through the contacts; and if current is still present through the contacts, then provide another gate signal to the semiconductor switch to cause the semiconductor switch to again pulse on for another pre-determined period of time so as to route current to the semiconductor switch.

16. The hybrid DC switching device of claim 15 wherein the controller is further configured to continue to provide intermittent gate signals to the semiconductor switch until zero current is measured through the contacts.

17. The hybrid DC switching device of claim 15 wherein the electromechanical switch comprises an AC contactor bar with contacts in a parallel arrangement, the AC contactor bar being configured to provide galvanic isolation between the contacts.

18. The hybrid DC switching device of claim 15 wherein the electromechanical switch comprises a circuit breaker.

19. The hybrid DC switching device of claim 15 wherein the solid state device further comprises a snubber circuit including a capacitor and a resistor, the snubber circuit configured to suppress voltage transients in the solid state device.

20. The hybrid DC switching device of claim 15 wherein the wherein the solid state device comprises one of a unidirectional switch and a bidirectional switch.

21. The hybrid DC switching device of claim 15 further comprising a free-wheeling diode configured to circulate load inductive currents.

22. A hybrid DC contactor comprising:

a plurality of main contacts configured to provide a first current path between a DC power source and a load;

an electromagnetic coil configured to position the plurality of main contacts in a closed position when power is supplied thereto, with the plurality of main contacts moving from the closed position to an open position when power to the electromagnetic coil is terminated;

a solid state device positioned in parallel with the plurality of main contacts, the solid state device including a semiconductor switch that, when turned on, provides a second, parallel current path that diverts current away from the plurality of main contacts when the main contacts are being opened in either direction; and a controller configured to:

terminate a supply of power to the electromagnetic coil so as to cause the plurality of main contacts to begin to open;

detect an arc voltage across the main contacts as the main contacts are opening;

provide a gate signal to the semiconductor switch to cause the semiconductor switch to pulse on for a pre-determined period of time so as to route current to the semiconductor switch;

institute a delay period subsequent to detecting the arc voltage and prior to providing the gate signal to the semiconductor switch, so as to prevent a re-strike voltage across the main contacts;

measure a current through the main contacts; and if current is still present through the main contacts, then provide another gate signal to the semiconductor switch to cause the semiconductor switch to again pulse on for another pre-determined period of time so as to route current to the semiconductor switch.

23. A hybrid DC contactor comprising:

a plurality of main contacts configured to provide a first current path between a DC power source and a load;

an electromagnetic coil configured to position the plurality of main contacts in a closed position when power is supplied thereto, with the plurality of main contacts moving from the closed position to an open position when power to the electromagnetic coil is terminated;

a solid state device positioned in parallel with the plurality of main contacts, the solid state device including a semiconductor switch that, when turned on, provides a second, parallel current path that diverts current away from the plurality of main contacts when the main contacts are being opened in either direction; and a controller configured to:

terminate a supply of power to the electromagnetic coil so as to cause the plurality of main contacts to begin to open;

detect an arc voltage across the main contacts as the main contacts are opening;

provide a gate signal to the semiconductor switch to cause the semiconductor switch to pulse on for a pre-determined period of time so as to route current to the semiconductor switch;

measure a current through the main contacts;

if current is still present through the main contacts, then provide another gate signal to the semiconductor switch to cause the semiconductor switch to again pulse on for another pre-determined period of time so as to route current to the semiconductor switch; and wherein the pre-determined period of time for which the semiconductor switch is pulsed on is 50 microseconds for a first gate signal and 20 microseconds for each additional gate signal.

* * * * *